United States Patent [19]

Asano

[11] Patent Number: 4,831,467
[45] Date of Patent: May 16, 1989

[54] APPARATUS FOR RECORDING AND REPRODUCING A SIGNAL

[75] Inventor: Hisashi Asano, Tokyo, Japan

[73] Assignee: Sony Corporation, Tokyo, Japan

[21] Appl. No.: 148,446

[22] Filed: Jan. 26, 1988

[30] Foreign Application Priority Data

Jan. 28, 1987 [JP] Japan ................................. 62-17969

[51] Int. Cl.⁴ ............................................. G11B 15/18
[52] U.S. Cl. .................................... 360/72.2; 360/69
[58] Field of Search ................................. 360/72.2, 69

[56] References Cited

U.S. PATENT DOCUMENTS 4,641,208  2/1987  Inazawa et al. .................... 360/72.2

FOREIGN PATENT DOCUMENTS 0187029 12/1985 European Pat. Off. .
0203797  5/1986 European Pat. Off. .
0220991 10/1986 European Pat. Off. .
3704329A1 8/1987 Fed. Rep. of Germany .

Primary Examiner—Robert S. Tupper
Attorney, Agent, or Firm—Philip M. Shaw, Jr.

[57] ABSTRACT

An apparatus for recording a program number on a recording medium arranged so that after its operation mode is changed into the recording standby mode, a desired program number can be selected by means of one or more keys and the selected program number is recorded at each program when the recording is started.

3 Claims, 5 Drawing Sheets

FIG. 1
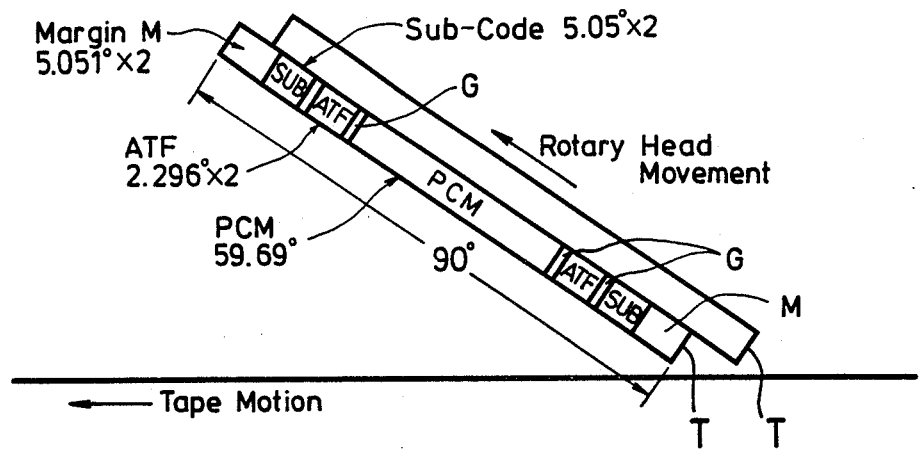
FIG. 2A
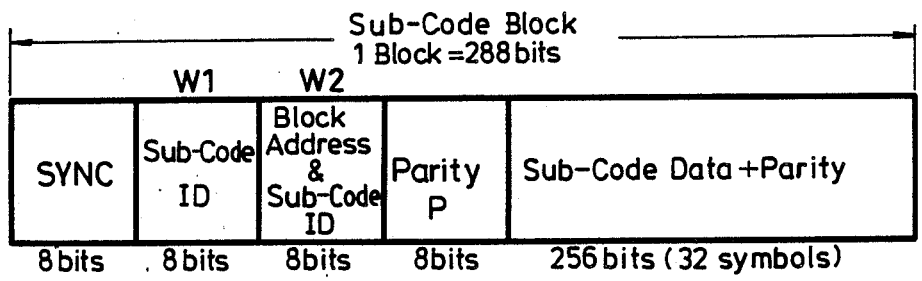
FIG. 2B
| W1 | | | W2 | |
|---|---|---|---|---|
| Sub-Code ID | | | Sub-Code ID | Block Address |
| Control ID | Data ID | 1 | Format ID | ×××0 |
| PNO-2 | PNO-3 | 1 | PNO-1 | ×××1 |

APPARATUS FOR RECORDING AND REPRODUCING A SIGNAL

BACKGROUND OF THE INVENTION

1. Field of the Invention

The present invention relates generally to apparatus for recording a program number for each selection recorded on a recording medium and more particularly to an apparatus for setting a desired program number and for recording the thus set program number which has to increment for each recorded selection.

2. Description of the Prior Art

A known type of digital tape recorder employs rotary heads for recording a PCM (pulse code modulated) audio signal on a tape. This digital tape recorder is commonly called an R-DAT. The R-DAT has a small rotary drum whose diameter is, for example, about 30 mm. The tape is wrapped around this small rotary drum over an angular range of 90°. Also, two rotary heads, having different azimuth gap angles, are mounted opposite to each other in the rotary drum over an angular distance of 180°. These rotary heads are rotated at a revolution speed of, for example, 2000 r.p.m. to alternately scan the tape by a tape wrapping angle of 90° each.

The audio signal is sampled at a sampling frequency of, for example, 48 kHz, and each sampled value is processed by 16-bit linear quantization to thereby produce a PCM audio signal. This PCM audio signal is timebase-compressed by the compressing ratio corresponding to the tape wrapping angle of 90° with every half revolution of each of the rotary heads and then recorded on the tape as a skewed track by each of the rotary heads. Upon reproduction, the PCM audio signal reproduced from the tape by the two rotary heads is decoded, timebase-expanded and then reconverted to the original analog audio signal.

On each track, a signal used for a tracking servo during reproduction, a time code and a sub-code signal such as a program number or the like inserted into the beginning of the music as well as PCM data, are recorded on an area different from the PCM data area.

In such an R-DAT, upon recording, a start ID (identifying) signal is recorded for each recorded selection on the basis of a CD (compact disc) sync. signal (which is a sync. signal indicating the music interval supplied from a CD player that is placed in the recording mode) and a level sync. signal (which is a sync. signal indicating a muted portion of a music signal as a music interval). In order to record the program number together with the start ID signal, it is proposed that only the program number increments be recorded, one by one, beginning with the first recorded selection. Alternatively, it is proposed that the program number is not recorded together with the start ID signal but that instead it is rewritten by a so-called renumbering scheme (as disclosed in U.S. Pat. No. 4,641,208) at the completion of the recording. In this case, without any condition, the program number is sequentially incremented from the first recorded selection and then recorded on the tape from its beginning.

OBJECTS AND SUMMARY OF THE INVENTION

It is an object of the present invention to provide an improved apparatus for recording a program number signal.

It is another object of the present invention to provide an apparatus which sets a desired program number and then records a program number which increments for each selection recorded on the recording medium.

According to one aspect of the present invention, there is provided an apparatus for recording a program number signal on a recording medium comprising (a) key input means for determining a desired program number;

(b) means for placing said recording apparatus into a recording standby mode;

(c) means for detecting the beginning of a program; and (d) means for recording a program number on said recording medium after the recording is started, said program number incrementing sequentially to the beginning of the program from the initial program number inputted by said key input means in the recording standby mode.

These and other objects, features and advantages of the present invention will become apparent from the following description of the illustrative embodiment, to be taken in conjunction with the accompanying drawings, throughout which like reference numerals represent the same or similar elements.

BRIEF DESCRIPTION OF THE DRAWINGS

FIG. 1 is a schematic representation illustrating a tape format used in a R-DAT;

FIGS. 2A and 2B are respectively schematic diagrams showing an example of a sub-code signal recorded on a sub-code area of a recorded track;

DESCRIPTION OF THE PREFERRED EMBODIMENT

Figure 3:
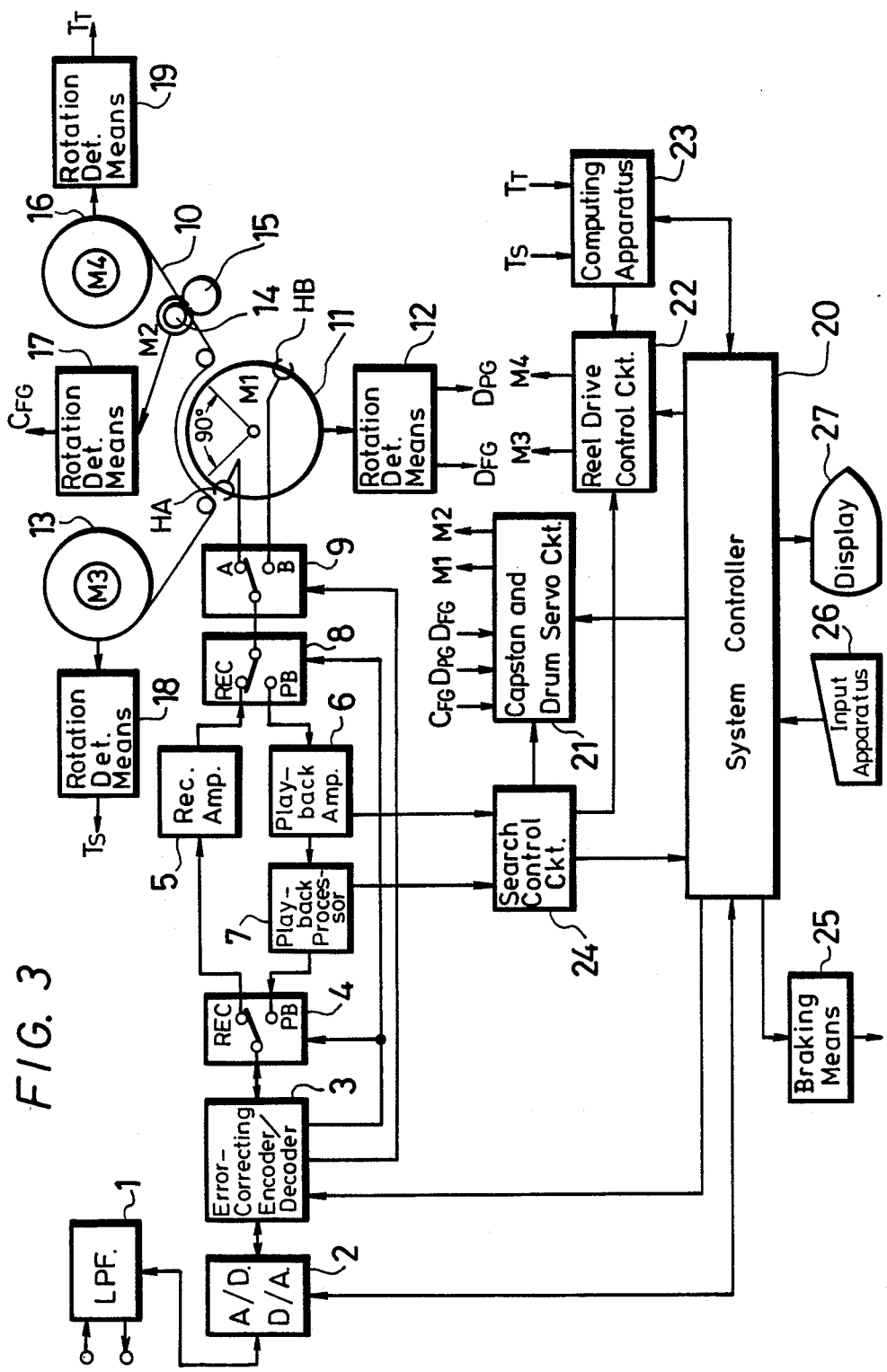
FIG. 3 is a block diagrams showing an embodiment of an apparatus for recording a program number signal on a recording medium according to the present invention.

Now, an embodiment of an apparatus for recording a program number signal on a recording medium according to the present invention will hereinafter be described with reference to the drawings.

FIG. 1 illustrates the tape format of the R-DAT. As illustrated in FIG. 1, a PCM audio signal is recorded on a data area PCM of less than 60° that is located in the midst of each track T having an angular range of 90°. At both sides of this data area PCM, there are provided two areas ATF (auto tracking follow, each area AFT having an angular range of about 2.3°) in which a pilot signal for a tracking servo is recorded. At both sides of the areas ATF, there are provided two sub-code areas SUB (each having an angular range of about 5°) in which a sub-code signal is recorded.

Since the tracking servo pilot signal area ATF and the sub-code areas SUB are provided at the upper and lower portions of each track T as described hereinabove, drop-outs can be removed and as many sub-code signals as possible can be obtained in the high speed search mode.

Guardband areas G separate each of the data area PCM, the pilot signal area ATF and the sub-code area SUB. The beginning and end of each track T are used as margin areas M.

As one of the sub-code signals, the program number signal is recorded on the start portion (beginning) of each program (recorded selection) during a time duration of several seconds as follows.

In beginning the recording mode, the R-DAT starts the recording from the stop mode or pause mode and the start ID signal is recorded during a time duration of, for example, 9 seconds from the beginning. If, during the recording, a non-signal portion (in which no signal is recorded) occurs in a music interval or a non-signal interval between two adjacent music program continues, for example, for more than two seconds, then this start ID signal is also recorded at the beginning of the next selection (next program) during a time duration of 9 seconds. The start ID signal can furthermore be manually recorded by the user during recording at a desired position (for example, the position that appears to the listener to be the beginning of the program selection). Also in the reproduction mode, the start ID signal can be manually recorded by the user.

When the tape on which the start ID signal is recorded on the sub-code area SUB as a part of the sub-code signal at the beginning of the music program is rewound and the R-DAT is set in the program number signal recording mode, the R-DAT searches for the start ID signal from the tape top and sequentially rewrites the start ID signal into the program number signal. Thus, when the start ID signal is recorded at the beginning of each recorded selection, the serial numbers for each recorded selection are written from the tape top in the sub-code area SUB as the program number signals. This operation is what is called renumbering and the renumbering system is disclosed in U.S. Pat. No. 4,641,208.

The sub-code blocks of 8 blocks are written in each sub-code area SUB and a sub-code of the same content is recorded in the upper and lower sub-code areas SUB of each track T.

FIG. 2A illustrates the format of the sub-code block, in which one block of the sub-code block is formed of 288 bits similarly to the PCM data block.

One block of the sub-code block is constructed according to the following. As shown in FIG. 2A, one block of the sub-code block is formed of a block synchronizing signal SYNC of 8 bits, data W1 of 8 bits forming a sub-code ID, data W2 of 8 bits forming a sub-code ID and its block address signal, a parity P of 8 bits for correcting errors generated in the data W1 and W2, and the remaining 256 bits (32 symbols where one symbol is formed of 8 bits) of sub-code data and a parity for correcting errors generated in the sub-code data in this order.

The 8-bit data W1 and W2 will be described in more detail with reference to FIG. 2B.

Referring to FIG. 2B, the MSB (most significant bit) of data W2 is what is used to identify the sub-code block and the PCM data block. When the block is the sub-code block, the MSB of the data W2 becomes "1" as shown in FIG. 2B. The least significant 4 bits of the data W2 represent the block address, and the content of the sub-code ID is changed depending on whether its LSB (least significant bit) takes "0" or "1". Specifically, when the LSB of the block address is "0", the data W1 is formed of a control ID of 4 bits and data ID of 4 bits, while 3 bits of the sub-code ID in the data W2 represent a format ID.

The aforesaid start ID signal is recorded as the third bit of the control ID. The start ID "1" represents the beginning of recorded selection and the start ID "0" represents a portion other than the beginning of recorded selection.

When the LSB of the block address is "1", the most significant 3 bits of the data W1 and W2 represent the program numbers. In this case, the program number is expressed by 3 digits of binary coded decimal (BCD) code. The most significant 3 bits, designated PNO-1, of the block address of data W2 express the highest digit, the most significant 4 bits, designated PNO-2, of the data W1 express the middle digit and the least significant 4 bits, designated PNO-3, of the data W1 express the lowest digit, respectively. The program number is continuously expressed from 001 to 799. In this case, 000 represents "no program number" and 0AA represents "program number invalid".

The sub-code block in which the LSB of the block address is "0" and the sub-code block in which the LSB of the block address is "1" are alternately recorded in every 4 blocks of 8 blocks of each subccode area SUB to have the same content.

FIG. 3 illustrates a circuit arrangement of an embodiment of an apparatus for recording a program number signal on a recording medium according to the present invention. The signal system of the present invention will be described first.

Referring initially to FIG. 3, upon recording, an incoming analog audio signal is band-limited by a low-pass filter 1 and then supplied to an A/D converter section of an A/D (analog-to-digital)-D/A (digital-to-analog) converting circuit 2, in which it is converted into a digital signal. This digital signal is supplied to an encoder section of an error-correcting encoder/decoder circuit 3, in which it is encoded into a PCM audio signal at every block, interleaved and added to an error-correcting parity, a block sync. signal, a block address signal and a sub-code.

Upon recording, in synchronism with the switching of the circuit 3 to the encoder section switching circuits 4 and 8 are connected to their recording side contacts REC by a switching signal from the circuit 3. Then, the circuit 3 produces a PCM audio signal during the tape contact period of the rotary heads HA, HB. In this case, the PCM audio signal is produced during the half revolution period of the head HA or HB, while it is time-base-compressed by the compressing ratio of the rotation angle of 90° and added to a parity code or the like. The PCM audio signal is supplied through the switching circuit 4, a recording amplifier 5, the switching circuit 8 and a head change-over switching circuit 9 alternately to the rotary heads HA, HB, to be thereby sequentially recorded on a tape 10 as a skewed track.

The head change-over switching circuit 9 is alternately connected to the contacts A and B in response to a head switching signal from the circuit 3 in such a manner that the time base compressed (by the compressing ratio of the rotation angle of 90°) PCM audio signal is supplied to the head that is in contact with the tape 10.

Upon reproduction, the switching circuits 4 and 8 are connected to their playback side contacts PB in response to the switching signal from the circuit 3. Also, the head change-over switch 9 is alternately connected to either the contact A or B that is connected to the head HA or HB which is in contact with the tape 10 similarly to the recording mode. The PCM audio signal reproduced from the tape 10 by the heads HA and HB is supplied through a playback amplifier 6 to a playback processor circuit 7. In this playback processor circuit 7, the playback equalizing and the bit-synchronizing processes are performed so that the PCM audio signal supplied thereto is therefore shaped into digital data. Also, a reproduced clock signal is produced from a PLL (phase-locked loop) circuit (though not shown) provided in the playback processor circuit 7 and is then fed to a search control circuit 24 which will be described later.

The PCM data from the playback processor circuit 7 is supplied to the error-correcting encoder/decoder circuit 3. Upon reproduction, the circuit 3 is operated as the decoder so that the PCM signal supplied thereto is corrected for error and then decoded.

The thus decoded signal is reconverted into an analog signal by the D/A converter section of the A/D-D/A converting circuit 2. This reconverted analog signal is reproduced as an audio signal through the low-pass filter 1.

The head drum and the tape running control system of the apparatus of the invention will be described next with reference to FIG. 3.

There is shown a head drum 11. On this head drum 11, there are mounted two rotary heads HA, HB with an angular spacing of 180° and slightly protruding from the peripheral surface of the head drum 11. A drum motor M1 rotates the head drum 11 at a speed of 2000 r.p.m. in one direction.

Rotation detecting means 12 is provided to detect the rotation of the drum motor M1. The rotation detecting means 12 produces a frequency signal $D_{FG}$ proportional to the rotational speed of the head drum 11 (revolution speed of the head) and a signal $D_{PG}$ indicative of the rotary phase of the head.

The magnetic tape 10 is stretched between a supply reel 13 and a take-up reel 16. The magnetic tape 10 is supplied from the supply reel 13, obliquely wrapped around the peripheral surface of the head drum 11 over an angular range of 90°, transported between a capstan 14 and a pinch roller 15 and then rewound by the take-up reel 16.

A capstan drive motor M2 rotates the capstan 14 to transport the magnetic tape 10. A rotation rate detecting means 17 is provided to detect the rate of rotation of the capstan drive motor M2 and produces a frequency signal $C_{FG}$ that is proportional to the rotational speed of the motor M2.

Reel motors M3 and M4 are provided to drive the tape reels 13 and 16. Rotation detecting means 18 and 19 are respectively provided to detect the rotational speeds of these reel motors M3 and M4 and produce frequency signals $T_S$ and $T_T$ proportional to the rotational speeds of the motors M3 and M4, respectively.

The apparatus of the present invention further comprises a system controller 20, a capstan and drum servo circuit 21, a reel drive control circuit 22, a computing apparatus 23 for controlling the rotation of the reels 13 and 16, the search control circuit 24 and braking means 25.

Furthermore, an input apparatus 26 having various operation buttons is provided to input various data to the system control circuit 20. A display 27 is provided to display the tape moving direction, the recording and/or reproduction mode, the program number, etc.

The capstan and drum servo circuit 21 receive the signal DFG indicative of the rotational speed of the rotary heads HA, HB as well as the signal DPG indicative of the rotary phase thereof from the rotation detecting means 12 and the signal $C_{FG}$ indicative of the rotation speed of the capstan 14 from the rotation detecting means 17. Then, in response to the signal from the system controller 20, this servo circuit 21 produces a signal that is supplied to the motor M1 to control the rotational speed and the rotary phase thereof upon recording and normal reproduction. Also, the servo circuit 21 supplies a servo control signal to the motor M2, whereby the motor M2 is servo-controlled to transport the magnetic tape 10 at a constant speed.

Figure 4:
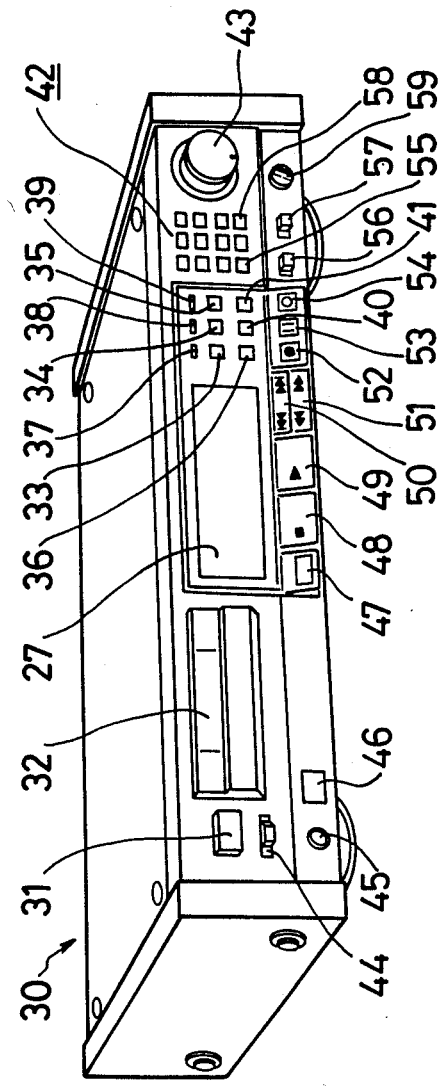
FIG. 4 is a perspective view illustrating the appearance of an R-DAT to which the present invention is applied.

FIG. 4 illustrates the appearance of the main body of the R-DAT generally indicated by reference numeral 30. As illustrated in FIG. 4, the main body 30 comprises a power switch 31 and a cassette tray 32. Upon use, the user inserts into this cassette tray 32 a cassette tape (not shown) with its window facing upward and a mis-erase preventing tip facing this side. This R-DAT or main body 30 is provided with an auto write button 33, a manual write button 34, an erase button 35 and a renumbering button 36 that are all associated with the start ID signal.

When the start ID signal is automatically recorded upon recording, the auto indication lamp of the auto write button 33 is lit. When the auto indication lamp is not lit, the auto write button 33 is actuated. Then, each time the synchronizing signal is transmitted at the beginning of a recorded selection or the recording level is increased again after it has decreased below the constant level for longer than three seconds the start ID signal is recorded during a time duration of 9 seconds.

The manual write button 34 can be actuated in order to record the start ID signal at a desired place during recording (the manual indication lamp is lit). If the manual write button 34 is actuated, the start ID signal is recorded during a time duration of 9 seconds from the actuation of the button 34.

The erase button 35 is actuated in order to erase the start ID signal. If the start ID signal and the program number signal are both recorded, both of them are erased by actuating the erase button 35.

The renumbering button 36 is actuated in order to renumber the program numbers from the tape top. If the start ID signal is recorded alone, the program number can be renumbered sequentially according to this method.

Tape counter buttons 37 to 39 are provided which are respectively used to switch the tape counter indication, to reset the counter and to memorize the point at which the counter is reset. The tape counter buttons 37, 38 and 39 are respectively the mode button, the reset button and the memory button 39 and they will be described hereinbelow.

Each time the mode button 37 is actuated, the counter indication on the indication window is changed. The counter indication is the tape running time, the music playing elapse time and the remaining amount of tape. When the counter indication is displayed, the counter is reset to 0m00s by actuating the reset button 38 and the position of 0m00s is memorized by actuating the memory button 39. When the rewind button is actuated, the tape is rewound and stopped at the position of 0m00s. When the play button is actuated while actuating the rewind button, the tape is rewound up to the position of 0m00s and the reproduction is automatically started at the above 0m00s position.

A skip ID write button 40 and a skip ID erase button 41 are respectively provided to record and erase the skip ID signal.

The skip ID write button 40 has to be actuated in order to skip the unnecessary portion of the desired data when the user wants to listen to the music later upon recording and reproduction. If the skip ID write button 40 is actuated, the skip ID write button lamp 40 is flashed and then the skip ID signal is recorded during a time duration of one second. The skip ID erase button 41 is actuated in order to erase the immediately-preceding skip ID signal. The skip ID erase button lamp is blinked during the period in which the tape is being rewound, while it is lit during the period in which the skip ID signal is being erased. The system employing the skip ID signal is disclosed in U.S. patent application Ser. No. 858,023 filed on May 1, 1986.

Further, numeral (0 to 9) buttons, or ten keys 42 are provided. If a desired number is selected by using the ten keys 42 before the recording is started (recording standby mode), the recorded selection number is automatically renumbered from the desired number. Upon reproduction, the user selects the recorded selection number of the music that the user wishes to listen to by operating the ten keys 42. When the start button is pressed, the reproduction is started from the beginning of the recorded selection of the selected number.

A recording level control knob 43 is provided to adjust the recording level with reference to the peak level meter. The outside of the recording level control knob 43 is used to adjust the recording level of the L (left) channel and the inside of the recording level control knob 43 is used to adjust the recording level of the R (right) channel for a stereo signal. Both of the L and R channels can be operated at the same time.

A timer switch 44 is normally set in the OFF-state. When using an independent timer to start the recording and/or the reproduction at a desired time, the timer switch 44 is changed over to the ON-state. A headphone jack 45 is provided to enable the user to enjoy the music by a headphone. A light receiving sensor 46 is provided to receive a remote control signal, e.g. an infrared signal, transmitted from a commander (not shown). A button 47 is provided to open and/or close the cassette tray 32.

The following tape operation buttons are provided to operate the tape. That is, a stop button 48 is actuated in order to stop the movement of the tape. A play button 49 is actuated in order to cause the recorded signals to be reproduced. An AMS (automatic music sensor) button 50 is actuated in such a manner that when the beginning of a recorded selection is searched in the reverse direction, its portion marked with |◄◄ is pushed while in the forward direction, its portion marked with ►►| is pressed. A fast forward (FF)/cue ( ►► ) and rewind/review ( ◄◄ ) button 51 is also provided. If this button 51 is actuated during the play mode, the R-DAT is placed in the cue or review mode, while during the stop state it is placed in the FF or rewind mode. Further, there are provided a recording button 52 and a pause button 53. If the mechanical deck of the R-DAT is continuously put in the standby mode by this pause button 53 for a time duration of about 10 minutes, the mechanical deck is automatically released from the standby mode and then placed in the stop mode. A recording-muting button 54 is also provided.

A clear button 55 is provided when a wrong recorded selection number is set. If this occurs before the start button is actuated, the wrong recorded selection number can be erased by operating the button 55. A skip switch 56 is turned on in order to skip a portion from the position where the skip ID signal is recorded upon playback to the next start ID signal. It is turned off in order to reproduce the whole recorded selection upon reproduction. An input change-over switch 57 is provided which is used to switch input sources, an ANALOG (to record a signal from an appliance connected to a LINE IN terminal) and a DIGITAL (to record a signal frmm the appliance connected to a DIGITAL IN terminal) upon recording. There is provided a start button 58. When the start button 58 is actuated after the recorded selection number of a desired recorded selection is selected by the ten keys 42, the reproduction is started from the beginning of the selected recorded selection immediately. If the start button 58 is actuated in the stop or playback mode, the beginning of each recorded selection is reproduced during a time duration of about 8 seconds. This is also true for the beginning of the next recorded selection (that is, the so-called music scan).

Figure 5:
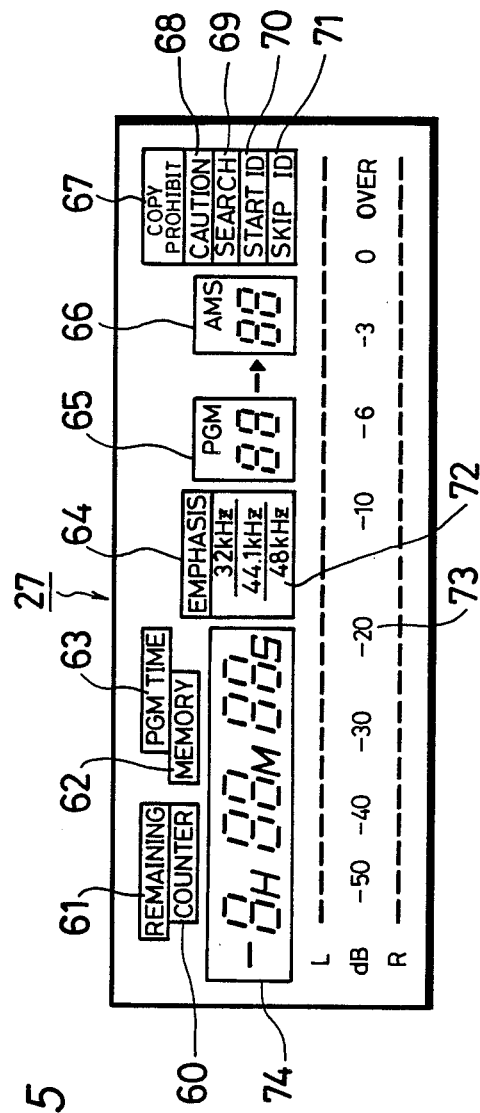
FIG. 5 is a front view illustrating a front panel of the display of the R-DAT shown in FIG. 4.

FIG. 5 shows the front panel of the display 27 in detail. As shown in FIG. 5, a counter indication section 60 is provided to indicate that the tape running time is roughly indicated on the counter. A remaining (REMAINING) indication section 61 is adapted to indicate that the remaining time up to the tape end is roughly indicated on the counter. A memory (MEMORY) indication section 62 is provided to indicate that the position, 0m00s is memorized by actuating the memory button 39. A program time (PGM TIME) indication section 63 is provided to indicate that the played time of the present recorded selection is indicated on the counter.

An emphasis (EMPHASIS) indication section 64 is provided to automatically effect de-emphasis and to light the emphasis indication lamp when the emphasized tape is reproduced. This emphasis indication section 64 is also lit when a signal from an emphasized source connected to the DIGITAL IN terminal is recorded. The emphasis indication section 64 is lit when a signal from the apparatus connected to the LINE IN terminal is recorded. A PGM (program number) indication section 65 is provided which indicates the present program number if the program number is recorded. An AMS (automatic music sensor) indication section 66 is provided. When the button 50 is actuated, the AMS indication section 66 displays to the user how many recorded selections, including the present recorded selection, are scanned in the forward or reverse direction. When a desired recorded selection is selected by means of the ten keys 42, the number of the desired recorded selection is displayed during a period when the desired recorded selection is searched.

A digital copy prohibit (COPY PROHIBIT) section 67 is provided to blink, letting the user know that digital dubbing is prohibited by a digital copy prohibit code. In this case, the recording cannot be made. A caution (CAUTION) indication section 68 is provided to blink, disabling the mechanical deck if a drop of water is produced on the mechanical deck due to a dewdrop during the period where the mechanical deck is being operated. A search (SEARCH) indication section 69 is provided to light during the skipping operation if the button 50 is actuated or the recorded selection is directly selected by specifying the recorded selection number. A start ID (START ID) indication section 70 is provided to blink during the period in which the start ID signal is being recorded (about 9 seconds) and/or erased, while it is lit during the period in which the signal portion in which the start ID signal is recorded is reproduced. A skip ID (SKIP ID) indication section 71 is provided to momentarily flash during the period in which the skip ID signal is being recorded (about one second) and/or erased. This skip ID indication section 71 is also flashed when the signal portion in which the skip ID signal is recorded is just reproduced upon reproduction.

A sampling frequency indication section 72 is provided to light in response to the sampling frequency of the digital program source (32 kHz: DBS (direct broadcast satellite) broadcasting, 44.1 kHz: recorded DAT soft tape, 48 kHz: recording and reproduction for DBS and DAT). A peak level meter 73 is provided to indicate the peak value of the level of the signal now being recorded and to indicate the peak value of the recorded signal level upon reproduction. A counter 74 is provided to indicate the tape running time, the played time of the present recorded selection and the remaining time up to the tape end. The content indicated on the counter 74 is changed each time the counter mode button 37 is actuated.

The recording operation for recording a program number on a recording medium will now be described. According to the present invention, there is provided an apparatus for recording a program number which includes at least the ten keys 42 for searching the program number. After the operation mode of the apparatus is changed to the recording standby mode (by actuating the buttons 53, 52 and 49) or to the rehearsal mode (by actuating the button 34), a desired program number is determined by using the program search keys 42. Then, the recording is started and the program number is recorded at every recorded selection.

Initially, the operation move is changed into the recording standby mode. That is, after the pause button 53 is actuated, the recording button 52 and the play button 49 are actuated simultaneously. Alternatively, the operation mode is changed into the rehearsal mode (playback mode for searching where to record the start ID signal), or the start ID manual button 34 is pressed one time. The rehearsal mode is already described more fully in U.S. patent application Ser. No. 062,867 filed on June 15, 1987. Thereafter, a desired program number that the user wants to record first is selected by using the ten program search keys, that is, numeral buttons 42 and the recording is started. In other words, when the operation mode is the recording standby mode, the pause button 53 is not depressed. When the operation mode is the rehearsal mode, the manual button 34 is actuated again. Then, the program number which is incremented with each recorded selection is recorded together with the start ID signal. Thus, the program number can be recorded on a desired place at desired time.

Now, the operation associated with the recording of the program number will be described with reference to flow charts forming FIGS. 6 and 7.

The routine for determining the value of the program number will be described with reference to FIG. 6.

Figure 6:
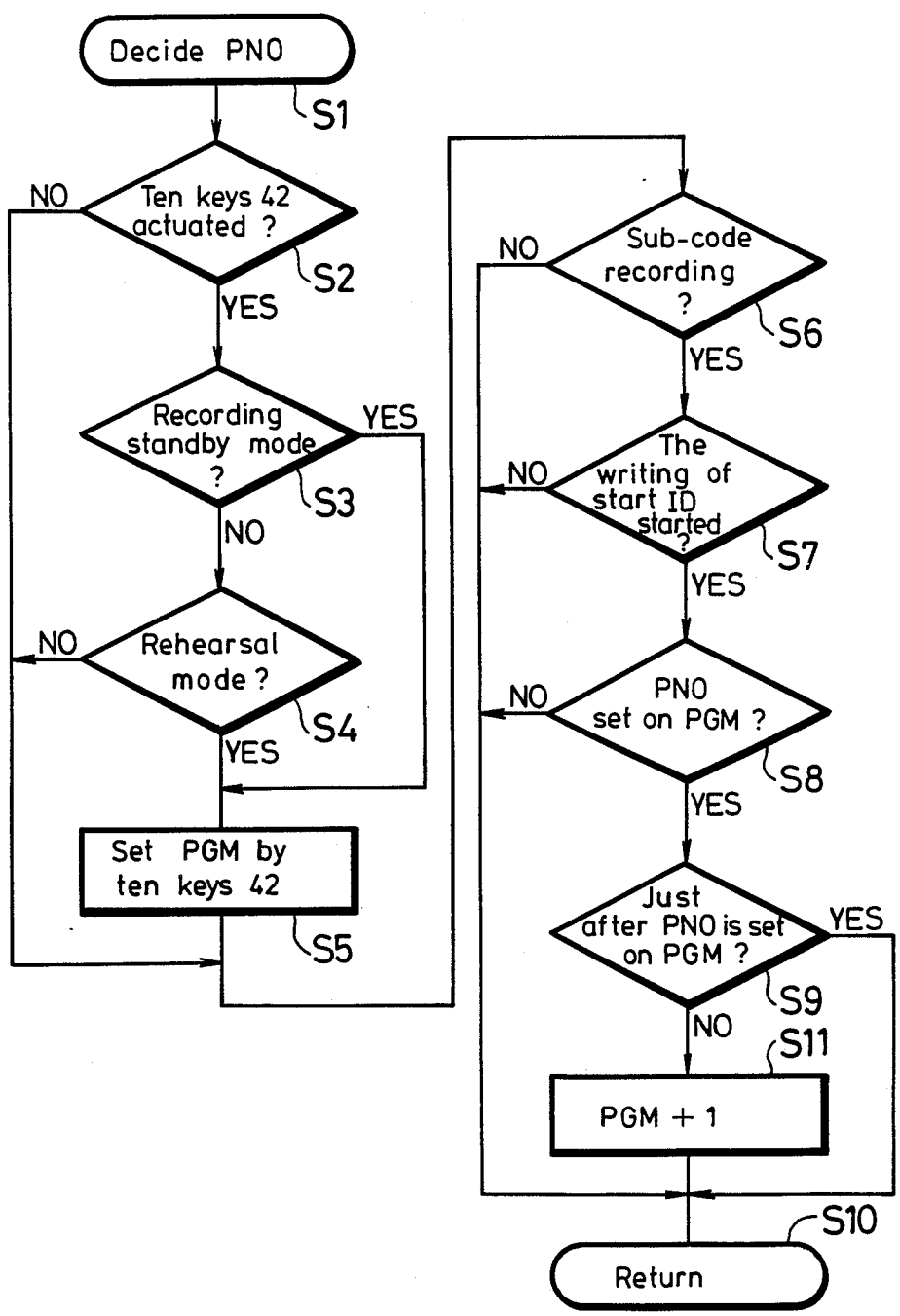
FIGS. 6 and 7 are flow charts to which references will be made in explaining the operation of the present invention, respectively.
Figure 7:
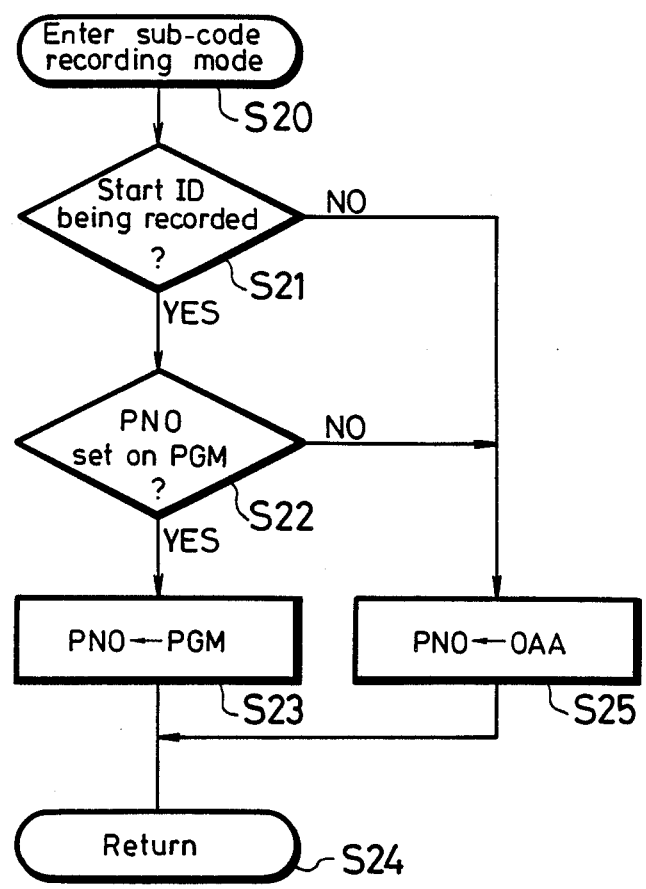

As shown in FIG. 6, this routine begins with step S1. At step S1, the program number that the user wants to write is decided. At the next decisional step S2, it is determined by the system controller 20 whether one or more of the ten keys 42 corresponding to the program number are actuated or not. If one or more of the ten keys 42 are pressed, the processing goes to the next decisional step S3. At step S3 the system controller 20 senses whether or not the operation mode is the recording standby mode, i.e. whether or not the recording button 52 and the play button 49 are actuated simultaneously after the pause button 53 is actuated. If the operation mode is not the recording standby mode, the processing goes to the next decisional step S4 where the system controller 20 judges whether or not the operation mode is the rehearsal mode, i.e. whether or not the start ID manual button 34 is pressed. If the operation mode is the rehearsal mode, the program proceed to step S5 where the program number ("PGM") is chosen by using the ten keys 42. The thus chosen program number is indicated on the PGM indication section 65. Alternatively, if it is determined at step S3 that the operation mode is the recording standby mode, the processing goes to step S5. At step S5, the program number is decided by using the ten keys 42 in a similar fashion.

After the program number is determined at step S5, the processing goes to the next decisional step S6. If it is determined at step S2 that none of the ten keys 42 are actuated or if it is determined at step S4 that the operation mode is not the rehearsal mode, the processing also goes to step S6.

At the decisional step S6 the system controller 20 determines whether or not the sub-code signal is being recorded. If so, the processing goes to the next decisional step S7 where it is determined by the system controller 20 whether or not the writing of the start ID signal is started, i.e. whether or not the recorded selection has changed to the next one.

If the writing of the start ID signal is started at step S7, it is determined at the next decisional step S8 by the system controller 20 whether the program number ("PNO") is set in the PGM indication section 65 or not. If the program number is set in the PGM indication section 65, the processing goes to the next decisional step S9. At step S9, it is decided by the system controller 20 whether or not the program number is what was just previously set in the PGM indication section 65. If so, the processing returns at step S10.

If the program number is not what was just previously set in the PGM indication section 65, it will be appreciated that that program number is what is recorded in the next recorded selection. Thus, the processing goes to step S11, in which the program number set (or indicated) on the PGM indication section 65 has to be incremented by one. Then, the processing returns at step S10.

If it is determined at step S6 that the sub-code signal is not being recorded or if it is determined at step S7 that the writing of the start ID signal is not started or if it is determined at step S8 that the program number is not set in the PGM indication section 65, then the processing returns at step S10.

The routine for recording the program number will be described with reference to the flow chart forming FIG. 7 which begins with step S20. At step S20, the operation mode is set in the sub-code signal recording mode. Then, it is determined at the next decisional step S21 by the system controller 20 whether or not the start ID signal is being recorded or, if the operation mode is the recording standby mode, it ss determined at step 21 by the system controller 20 whether or not the recording button 52 and the play button 49 are actuated simultaneously. If the operation mode is in the rehearsal mode, in a similar fashion, it is determined at step 21 by the system controller 20 whether the start ID manual button 3 is actuated or not. If the start ID signal is being recorded, the processing goes to the next decisional step S22.

There it is determined by the system controller 20 whether the program number PNO is set in the PGM indication section 65 or not. If the program number PNO is set in the PGM indication section 65, at step S23, the program number PNO set in the PGM indication section 65 is recorded, and then the processing returns at step S24.

If it is determined at step S21 that the start ID signal is not being recorded or if it is determined at step S22 that the program number is not set in the PGM indication section 65, the processing goes to step S25. At step S25, a program number invalid flag 0AA is recorded on the place where the program number is recorded. Then, the processing returns at step S24.

According to the above embodiment of the present invention, as described above, because in the recording or rehearsal mode the program number is recorded at each recorded selection (start ID signal), it is therefore possible to record a desired program number by utilizing the ten program search keys 42. While the ten keys 42 are originally used to search the program number, according to this embodiment, it is also possible to use the ten program search keys 42 as program setting keys by actuating the recording button 52 and the play button 49 simultaneously after the pause button 53 is actuated in the recording standby mode or by actuating the start ID manual button 34 in the rehearsal mode.

According to the present invention, as set forth above, since after the operation mode is changed into the recording standby mode or the rehearsal mode, a desired program number is determined by using the ten keys and then the recording is started to record the program number at every recorded selection, without renumbering the program numbers later, upon recording or in the rehearsal mode, the desired program number specified by the ten keys can be recorded together with the start ID signal.

It should be understood that the above description is presented by way of example only on a single preferred embodiment of the invention and it will be apparent that many modifications and variations thereof could be effected by one with ordinary skill in the art without departing from the spirit and scope of the novel concepts of the invention, so that the scope of the invention should be determined only by the appended claims.

I claim as my Invention

1. An apparatus for recording a plurality of programs and corresponding program numbers on a recording medium, the apparatus being of the type having a recording mode, a playback mode and a recording standby mode and comprising:

(a) key input means for selecting a desired program number;

(b) means for placing said recording apparatus into the recording standby mode;

(c) means for detecting the position on the medium of the beginning of a recorded program; and (d) means for recording the selected program number on said recording medium after the recording is started and thereafter sequentially incrementing and recording additional corresponding program numbers for each recorded program from the initial program number inputted by said key input means in the recording standby mode.

2. An apparatus for recording a program number on a recording medium according to claim 1, wherein said key input means further includes means for searching the recording medium for the program number and the corresponding program during reproduction.

3. An apparatus for recording a program number on a recording medium according to claim 1, further comprising indicating means for visually indicating the program number determined by said key input means.

* * * * *